United States Patent [19]

Nicolaisen et al.

[11] 4,032,128

[45] June 28, 1977

[54] PIVOTAL BEARING FOR AN OMEGA SPRING

[75] Inventors: Holger Nicolaisen, Nordborg; Leif Borge Tandrup, Sonderborg, both of Denmark

[73] Assignee: Danfoss A/S, Nordborg, Denmark

[22] Filed: Oct. 16, 1975

[21] Appl. No.: 616,570

[52] U.S. Cl. .......................... 267/159; 200/159 A; 200/339; 200/360
[51] Int. Cl.² .......................................... F16F 1/28
[58] Field of Search .......... 267/159, 158, 160, 164, 267/165; 200/329, 340, 338, 339, 159 A, 159 R, 1 TK

[56] References Cited

UNITED STATES PATENTS

| 2,761,936 | 9/1956 | Verkuil | 200/159 A |
| 3,358,108 | 12/1967 | Hansen | 200/340 |
| 3,604,868 | 9/1971 | Batcheller et al. | 200/339 |

Primary Examiner—James B. Marbert

[57] ABSTRACT

The invention relates to an omega type spring assembly and particularly the pivotal connection between the omega spring element and a bearing element. In a broad sense the invention involves replacing the conventional knife edge pivotal with a ball and socket connection in which the "socket" has the form of an elongated aperture with arcuately shaped edges. The "ball" has a tapered portion which engages the edges and the tapered portion may be spherical, conical or elliptical in shape. There are two contact points between the bearing element and the arcuately shaped edges of the aperture in the omega spring element.

8 Claims, 4 Drawing Figures

PIVOTAL BEARING FOR AN OMEGA SPRING

The invention relates to a pivotal bearing for an omega spring of leaf spring material, comprising a counterbearing body tapering to the end and having this end hingedly engaged in a hole at the end of the omega spring and supported thereby.

It is known to make the pivotal bearing of an omega spring, which is used in toggle switch device, in the form of a knife bearing. This, however, results in a comparatively large frictional surface between the groove and the edges of the counterbearing body engaged therein, because of relative motion occurring between the groove and edge during the pivotal movement. This frictional surface results in a large amount of friction and thus a correspondingly large hysteresis when the omega spring is switched over. This hysteresis detrimentally influences the accuracy of the instant of switching when operating the toggle switch device.

In a known pivotal bearing of the aforementioned kind, the hole is in the form of a blind hole having substantially the shape of a hollow spherical cap. Engaged in this hole there is the tapered rounded-off end of a pin in the form of a counterbearing body at the end of a set sorow. The diameter of the edge of the blind hole is larger than the diameter of the pin. This results in a smaller but still excessively large frictional surface between the inner face of the blind hole and the free end of the pin because this inner surface encloses the rounded-off end of the pin with a comparatively large area.

The invention is based on the problem of providing a pivotal bearing of the aforementioned kind in which a smaller amount of friction occurs.

According to the invention, this problem is solved in that the hold is in the form of an elongated hole of which the longitudinal edges are angular and have a wider spacing from each other at the centre than at the ends, that the dimensions of the elongated hole and of the counterbearing body are selected so that the counterbearing body lies on two opposed points of the longitudinal edges of the elongated hole, and that the counterbearing body is, at least in the region of contact determined by the pivotal angle zone, rotationally symmetrical to an axis parallel to the pivotal axis.

In this construction of pivotal bearing there is always only point contact between the counterbearing body and the omega spring at the contacting points on the edge of the elongated hole, irrespective of the pivotal angle. Whereas during the pivotal motion, of which the pivotal axis coincides with the contact points, the points of contact are slightly displaced on the surface of the counterbearing body depending on the size of the pivotal angle, this occurs only along lines and not along a surface. On the other hand, the position of the contact points on the longitudinal edges of the elongated hole remains substantially the same irrespective of the pivotal angle, namely at the location where the spacing between the edges of the hole is the largest. Consequently there is very little relative motion of the points of contact between the spring and counterbearing body and only along very short lines so that extremely little friction occurs.

Preferably, the counterbearing body is spherical, i.e. it can be a sphere or a spherical cap. Such a shape, particularly a sphere, is readily productible with conventional means, especially since its diameter must be selected to be larger than the maximum spacing of the longitudinal edges of the elongated hole. However, other rotationally symmetrical bodies, for example a double cone, an ellipsoid or a barrel-shaped body are also suitable.

It is particularly advantageous if the largest spacing of the longitudinal edges of the elongated hole is about 60 to 96 percent of the maximum width of the counterbearing body in the direction of the pivotal axis, preferably in the range of about 85 to 90 percent of said width. These dimensions ensure that the displacement of the contact points on the surface of the counterbearing body takes place along arcuate paths of comparatively small radius, so that the displacement path is correspondingly short and the frictional energy is low.

The longitudinal edges of the elongated hole can have the shape of two identical circular segments of which the radius is larger than the maximum spacing of the longitudinal edges, preferably about twice as large. This shape ensures that only one contact point will occur at each longitudinal edge of the elongated hole. The larger the radius of curvature of the circular segments in relation to the radius of curvature of the counterbearing body at the point of contact, the smaller will be the point of contact. On the other hand, the radius of curvature of the elongated edges should not be too large so as to ensure that the counterbearing body is automatically brought by the force of the omega spring into the position at which the contact points on the longitudinal edges have the largest spacing from one another. The construction of the longitudinal edges with a radius for curvature of about twice the maximum spacing of the longitudinal edges has here proved to be a favourable compromise.

Another embodiment for the edge of the hole is an ellipse. This has the advantage that its radius of curvature decreases towards the ends. The counterbearing body is thereby more positively brought into the position at which the contact points on the longitudinal edges have the largest spacing, in contrast with arcuate hole edges of which the radius of curvature is equal to the largest peak radius of the ellipse.

The length of the elongated hole can be selected to be about twice the maximum width of the elongated hole. In this way an adequate spacing is left between the counterbearing body and the transverse edges of the elongated hole to prevent friction between the transverse edges and the counterbearing body.

Preferably the elongated hole is throughgoing. A throughgoing hole is made easily, for example by stamping in the same operating step as stamping of the spring strip, whereby it is also easier to have sharp-edged hole edges than when impressing a blind hole.

A preferred example of the invention will now be described with reference to drawings.

Figure 1:
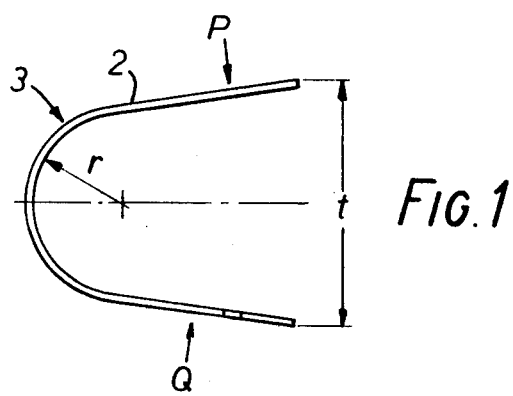
FIG. 1 is a side elevation of an omega spring.
Figure 2:
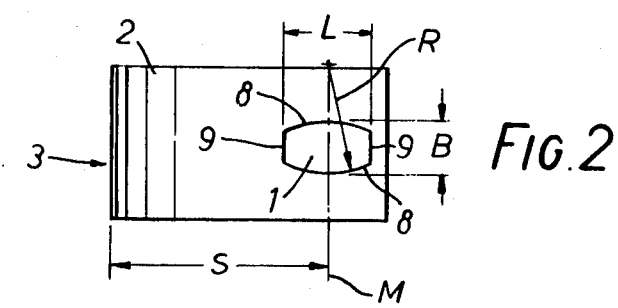
FIG. 2 is a view of the omega spring in the direction P.
Figure 3:
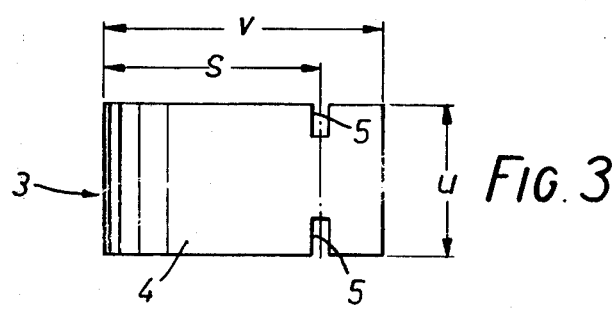
FIG. 3 is a view of the omega spring in the direction Q.
Figure 4:
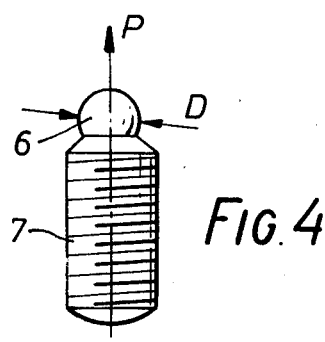
FIG. 4 is a side elevation of a set screw with sphere as counterbearing for the one end of the omega spring.

In the illustrated embodiment, the elongated hole 1 is formed in the end of the one limb 2 of an omega spring 3 made from tin-bronze. The other limb 4 is provided with recesses 5 in which a bifurcated counterbearing body (not shown) engages and, together with these recesses and the web between them, forms the one pivotal bearing of the omega spring 3.

The second pivotal bearing or pivotal joint is formed by the elongated hole 1 and a counterbearing body 6 in the form of a sphere or spherical cap of steel at the end of a set screw 7 which is directed towards the limb 2 of the omega spring in the direction of the arrow P and screwed so far into a portion that is fixed with respect to the housing that the sphere 6 is seated at two opposed points of the arcuate longitudinal edges 8 of the elongated hole 1, in the normal case the points of intersection of the centre line M and the longitudinal edges 8. For this purpose the maximum width B of the elongated hole 1 or the maximum spacing of the hole edges 8 is chosen to be about equal to half the radius R of curvature of the hole edges 8 and about equal to 88 percent of the diameter D of the sphere 6. The pivotal axis of the pivotal bearing them extends through the contact points, the contact points wandering along arcs on the surface of the sphere 6 during pivotal motion, the diameter of the arcs being substantially smaller than the diameter D of the sphere 6, namely only about 48 percent of D. In this way it is ensured that only line friction occurs, only along a very short path, whilst positive lateral guiding of the sphere 6 in the elongated hole 1 is at the same time ensured.

In order that the sphere 6 retains an adequate spacing from the rectilinear transverse edges 9 of the elongated hole 1, the length L of the elongated hole 1 is selected to be substantially equal to 2B.

Thus, with an omega spring 3 having for example $r = 3$ mm, $s = 7.2$ mm, $t = 8$ mm, $u = 5$ mm and $v = 9.5$ mm and a spring force of about 0.25 kp and higher, one may select $B = 1.75$ mm, $R = 3.5$ mm and $L = 3$ mm and $D = 2$ mm.

We claim:

1. An omega spring assembly comprising a bearing element, a generally U-shaped member having one leg with an elongated aperture therein having two arcuately shaped edges in mutually concave relation to each other, said edges being spaced apart a predetermined distance, said bearing element having a girth dimension larger than said predetermined distance and an adjacent tapered portion engaging said edges in load supporting relation thereto.

2. An omega spring assembly according to claim 1 wherein said bearing element tapered portion is a spherical surface portion.

3. An omega spring assembly according to claim 1 wherein the maximum distance between said arcuately shaped edges is between 60 and 96 percent of said bearing element girth dimension.

4. An omega spring assembly according to claim 1 wherein the maximum distance between said arcuately shaped edges is between 85 an 90percent of said bearing element girth dimension.

5. An omega spring assembly according to claim 1 wherein said edges are arc shaped with radii larger than the maximum distance between said edges.

6. An omega spring assembly according to claim 5 wherein said radii are approximately twice the maximum distance between said edges.

7. An omega spring assembly according to claim 1 wherein said aperture is elliptically shaped.

8. An omega spring assembly according to claim 1 wherein the length of said aperture is approximately twice its width.

* * * * *